Figure 1:
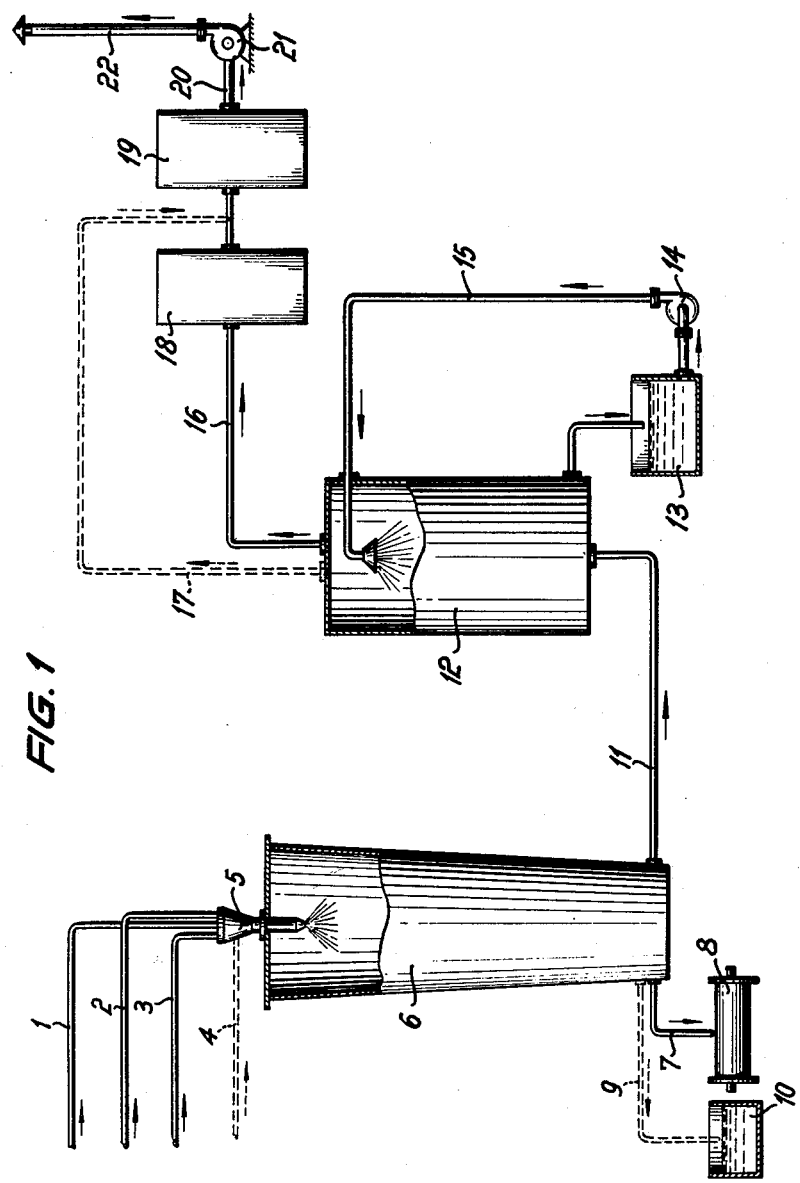

Feb. 2, 1965  G. HARTLAPP ETAL  3,168,373
PROCESS FOR THE MANUFACTURE OF ALKALI METAL PHOSPHATES
Filed Dec. 19, 1960  2 Sheets-Sheet 1

INVENTORS
Gerhard Hartlapp
Waldemar Bielenberg
Harri Kribbe
Klaus Beltz
Friedrich Thomas
BY Connolly and Hutz
ATTORNEYS 3,168,373
PROCESS FOR THE MANUFACTURE OF
ALKALI METAL PHOSPHATES
Gerhard Hartlapp, Knapsack, near Cologne, Waldemar
Bielenberg, Cologne Klettenberg, Harri Kribbe and
Klaus Beltz, Knapsack, near Cologne, and Friedrich
Thomas, Hermulheim, near Cologne, Germany, assignors to Knapsack-Griesheim Aktiengesellschaft, Knapsack, near Cologne, Germany, a corporation of
Germany
Filed Dec. 19, 1960, Ser. No. 76,710
Claims priority, application Germany, Dec. 18, 1959,
K 39,461
4 Claims. (Cl. 23—106)

The present invention is concerned with a process for the manufacture of alkali metal phosphates from alkali metal halides, phosphorus, oxygen and, if desired, water; it is also concerned with an apparatus for carrying out said process.

In the process according to the present invention, an alkali metal halide is finely sprayed, in the direction of a flame, within the spray cone formed by the stream of the components feeding the zone of flame i.e., phosphorus and oxygen, and the reaction product is then worked up in known manner.

As alkali metal halides there are advantageously used alkali metal chlorides. The oxygen required may be introduced in the form of air or mixtures of air and oxygen. The alkali metal halide may advantageously be sprayed while suspended in a stream of oxygen and/or air.

The phosphorus flame is produced by burning 100 grams of phosphorus with about 90–500 litres, advantageously about 180 litres, of oxygen. The reaction zone may be additionally charged with water in the form of steam. As alkali metal halide, sodium chloride or potassium chloride is preferably used. The phosphorus flame is advantageously fed with molten phosphorus.

If the process is carried out without the addition of steam, oxygen is introduced in at least such an amount as is sufficient to ensure, in addition to the reaction yielding alkali metal phosphates, oxidation of the chloride ion to free chlorine. For this purpose, an excess of oxygen of at least about 30%, advantageously about 50%, calculated on the stoichiometrically calculated amount, is used. The ratio of phosphorus pentoxide to alkali metal oxide is within the range of about 1:1 to about 1:2.

The phosphorus flame burns, with the zone of flame directed downward, from a burner disposed at the head of a tower. After the resulting hot melt of the reaction products has been cooled and has solidified, it is ground or dissolved in water or aqueous phosphate solution, while stirring, and then worked up into crystallized phosphates. The phosphate and/or phosphorus pentoxide entrained by the exhaust gas is separated from the latter in known manner, for example by washing nad absorption with concentrated phosphoric acid, and combined with the bulk of the reaction product. The hydrogen chloride contained in the exhaust gas leaving the washing unit is advantageously absorbed with an aqueous solution of hydrogen chloride, while the portion of chlorine gas contained in the exhaust gas which leaves the washing unit if the process is carried out in the absence of water, is worked up into hydrogen chloride and the latter is then absorbed.

In a modification of the present invention, the inner walls of the reaction chamber are kept at a temperature below the melting point of the reaction product by appropriate external cooling, which ensures the formation of a corresponding protective layer on the inner walls.

The apparatus for carrying out the process of the invention comprises a vertical reaction tower provided at the top with a burner which is designed as mixing nozzle. It further comprises a washing tower disposed after the lower gas outlet, a unit for producing hydrogen chloride if desired, a unit for absorbing same and a cooling roller or a dissolving vessel for the reaction product which is withdrawn at the bottom of the reaction tower. The mixing nozzle forming the burner, which is centrally disposed at the head of the reaction tower and directed downward, is provided with a feed line for the alkali metal halide which may be suspended in air or oxygen, a feed line for the phosphorus, which is advantageously in a molten form, a feed line for air, which may be enriched with oxygen, and a feed line for steam, which, however, may not be used, if desired. The aforesaid mixing nozzle consists of several pipe sockets of different diameters which are fitted concentrically one into the other and each of which is provided with one of the aforesaid feed lines. The pipe sockets narow in the direction of the burner orifice, whereby a wider socket end may project over a narrower one, if desired.

The process and apparatus of the invention can be used with sepcial advantage for the following reactions:

(I)
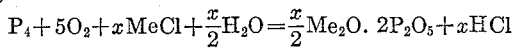

(II)
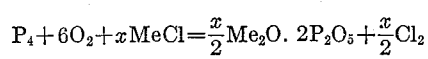

wherein $x$ may be within the range of 2 to 8 and Me stands for an alkali metal.

In detail the following may be said: The reactions described by the above equations could hitherto not be carried out on an industrial scale. Attempts to carry out the reactions in a rotary furnace failed because the reactions proceed too slowly and only incompletely in a melt and the difficulties arising from corrosion could not be removed. A phosphorus flame was allowed to burn into a rotary furnace and the alkali metal chloride was introduced into the melt in cocurrent or countercurrent. The products so obtained were, however, considerably contaminated with unreacted alkali metal chloride and the reactions in the melt took a very long time owing to the relatively small surface.

For carrying out the reaction according to Equation I, it has also been proposed to proceed in the gaseous phase. To obtain complete combustion of the phosphorus to phosphorus pentoxide, it has been proposed first to evaporate the phosphorous at 280° C. and to conduct the phosphorous vapor to a ring of burners. This arrangement permits complete combustion of the phosphorus but often renders it difficult to produce the density of energy necessary for the reaction in the reaction zone. It has, therefore, been proposed to provide for additional heating by means of hydrogen, fuel oil, heating gas, additional oxygen or electric current.

In the known processes, the device for burning the phosphorus and the inlet for the alkali metal chloride were disposed separately from each other. The alkali metal chloride was, therefore, not reacted with the formed phosphorus pentoxide at the hottest place and consequently the place of strongest heat formation, i.e., in the phosphorus flame, but was introduced in countercurrent or cocurrent at a different place of the reaction vessel. A melt of alkali metal chloride and already produced phosphate was thereby generally formed which could be more or less dechlorinated only by a prolonged heat treatment and by the action of phosphorus pentoxide.

Such dechlorination occurs the more readily the finer the distribution of the melt. It has been found that the reaction proceeds most rapidly and fairly completely if the desired end products are formed before a coherent melt has formed. When the reaction is carried out in a gaseous phase, a complete conversion is attained. By proceeding in the gaseous phase, many corrosion problems are avoided since the melt is substantially prevented from attacking the externally cooled walls of the reaction vessel.

For that purpose, it has already been proposed to introduce alkali metal chloride through a nozzle into a ring of phosphorus flames. That ring consisted, however, of a plurality of individual flames fed with phosphorus vapor so that a sharply limited hot zone of flame was not obtained but rather a relatively large reaction zone was heated. In this manner, no such large quantities of energy could be concentrated on a very small space as are necessary, for example, for a rapid and complete course of the aforesaid reactions and can be obtained by burning molten phosphorus. Moreover, according to the known method, the alkali metal chloride was not introduced in the direction of the phosphorus flame but about vertically to the ring of flames. For the above mentioned reasons, this arrangement could not be used on an industrial scale, either.

The process of the present invention permits the production of the density of energy necessary for the reaction and, since the latter is restricted to a very small, locally limited zone, the concentration of large amounts of energy on a small zone, by spraying molten phosphorus so finely through a nozzle that, with an appropriate amount of oxygen, the phosphorus is completely burnt to phosphorus pentoxide, even when alkali metal chloride is sprayed into the flame simultaneously and in the same direction and by providing, in the reaction according to Equation I mentioned above, for an appropriate amount of steam in the reaction or spraying tower. Especially, the reaction according to Equation II, i.e., the reaction using no water, necessitates higher temperatures and a higher density of energy, which can be obtained with the apparatus according to the invention by means of excess oxygen and molten phosphorus.

The process and apparatus of the invention have the further advantage that a retrograde course of the reactions of Equations I and II does not occur so that it is not absolutely necessary that the droplets of melt formed be quenched immediately after the reaction zone but they may advantageously be quenched outside the reaction tower.

The use of a nozzle for spraying molten phosphorus by means of air, oxygen or air enriched with oxygen, which nozzle is provided at its interior with another nozzle for spraying alkali metal chloride so that kind of a mixing nozzle is obtained, provides the highest possible density of energy in an extremely small space and the highest possible conversion with the lowest possible expenditure.

From the manufacture of phosphoric acid by heat treatment, it is known to burn liquid phosphorus with air or oxygen. In that process, however, no further substance is introduced into the phosphorus flame, such as, for example, alkali metal chloride in the present case. In the said manufacture of phosphoric acid, a temporarily poor or incomplete combustion of phosphorus may be compensated by after-oxidizing lower valency phosphorus oxides in the phosphoric acid circulating in the combustion tower. If, however, combustion is incomplete in the present process for making alkali metal phosphate, the phosphate cannot be after-oxidized, once it has left the zone of flame. The present process therefore puts considerably higher demands on the phosphorus combustion than the known processes.

Another characteristic of the process of the present invention consists in that the mixing nozzle constructed as a multi-substance nozzle is centrally arranged at the head of a spraying tower, the phosphorus flame being directed vertically downward. All the reactants and the reaction product formed are conducted in cocurrent with the exhaust gases from the top to the bottom of the spraying tower. In this manner, a pronounced temperature drop from the centrally disposed hot reaction zone to the walls of the spraying tower is obtained so that corrosion by the melt is substantially completely prevented if the walls of the spraying tower are additionally cooled with air or water. The finished melt may be drawn off at the bottom of the reaction tower, cooled and ground or may be conducted from the reaction tower into water and dissolved therein. In the latter instance, the phosphate solution so obtained can be worked up into other crystalline phosphates, such as triphosphate, pyrophosphate or orthophosphate.

Another advantageous feature of the present invention is that only a small amount of exhaust gas is formed during the reaction. Since the phosphorus flame, which is the only source of heat and oxygen-consuming device, needs only an excess of oxygen of about 10–100%, the amount of exhaust gas can be kept very small, especially when air enriched with oxygen or oxygen alone is used. Since the amount of phosphate and phosphorus pentoxide entrained from the reaction tower by the exhaust gas increases with the amount of exhaust gas, only small quantities of phosphate and phosphorus pentoxide need be washed out and absorbed after the reaction tower if the amount of exhaust gas is small. The washing unit for the exhaust gas may, therefore, be small. The absorption unit for the hydrogen chloride connected in series may also be relatively small if the hydrogen chloride is not too much diluted with large amounts of exhaust gas.

An apparatus suitable for use in carrying out the process of this invention is illustrated diagrammatically in the accompanying drawings, by way of example.

Figure 2:
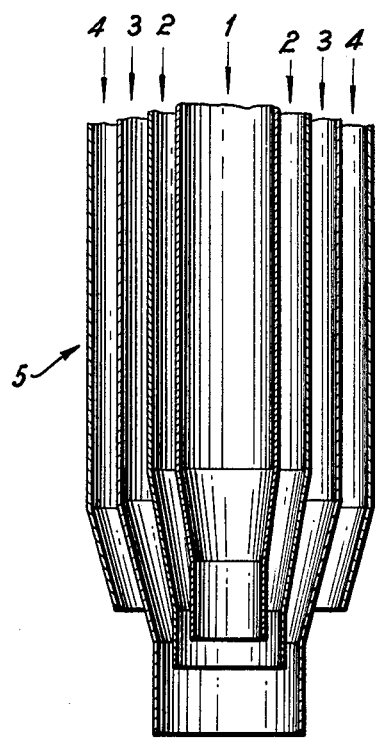

Referring to the drawings, FIGURE 1 is a flow diagram of the whole system and FIGURE 2 represents the burner 5 designed as a mixing nozzle (enlarged).

The apparatus of the invention comprises a burner 5 designed as mixing nozzle (multi-substance nozzle) which serves simultaneously as a burner for the phosphorous flame and as a dosing device for the reactants. To the mixing nozzle there are fed steam through feed line 4, if the reaction is conducted according to Equation I described above, phosphorous through feed line 2, alkali metal chloride suspended in air and/or oxygen through feed line 1 and air or oxygen through feed line 3; this succession of introduction is given only by way of example and any other succession may be used. The mixing nozzle or burner 5 is disposed centrally at the head of a spraying or reaction tower 6 and directed downward.

The melt formed in spraying tower 6 is conducted at will through discharge line 7 or 9 to a cooling roller or a dissolving or stirrer vessel 10. On cooling roll 8, a solid product is obtained. In stirrer vessel 10, the melt is dissolved in a solvent, for example water, to yield a solution from which crystalline phosphates are obtained.

The exhaust gas from spraying tower 6 is conducted through the lower gas outlet 11 to washing or absorption tower 12 to absorb the phosphate and/or phosphorous pentoxide entrained. Tower 12 is provided at the head with a nozzle for spraying the wash solution or with a centrifuge. The wash solution is passed by rotary pump 14 from collecting vessel 13 through cycle line 15 to the nozzle in washing tower 12.

The exhaust gas, which has been freed from entrained phosphate and/or phosphorous pentoxide, leaves washing tower 12 through line 16 if the reaction is conducted according to Equation II indicated above or through line 17 if the reaction is that of Equation I. Through line 16 the chlorine-containing exhaust gas flows to unit 18 for hydrogen chloride production. From unit 18 or line 17 the chlorine-containing exhaust gas flows to unit 19 where hydrogen chloride is absorbed. From unit 19 the residual gases are removed through line 20, blower 21 and chimney 22. If only a small amount of exhaust gas is obtained and no hydrogen chloride need be isolated, it is sufficient to pass the exhaust gas through a tower charged with lime.

The following examples are given for the purpose of illustrating the present invention, without limiting it it thereto:

*Example 1*

434 kilograms per hour ground sodium chloride (containing 99.8% NaCl) were sprayed in a suspended, and thus very finely distributed, form with 100 m.³ per hour oxygen via feed line 1 through a nozzle into a phosphorus flame which was fed with 190 kilograms per hour molten phosphorus (containing substantially 100% P) and which was introduced through feed line 2 and with 550 m.³ per hour air enriched with oxygen (oxygen content about 50%) introduced through feed line 3. The feed lines were under a pressure of about 2 to 3 atmospheres' gage. The molar ratio of phosphorus pentoxide to sodium oxide, which had formed was 1:1.20.

About 600 kilograms per hour of reaction product were formed by spraying the reactants in mixing nozzle 5 and were obtained at the lower end of spraying tower 6 as a melt having a temperature of about 600 to 700° C. The melt contained about 65% phosphorus pentoxide, 34% sodium oxide, 0.03% chlorine and 0.06% phosphorous trioxide. In one instance, the melt was then cooled on cooling roll 8 to yield a non-crystalline polyphosphate glass which was subsequently ground. In another instance, the melt was dissolved in stirrer vessel 10 and the resulting solution was worked up in known manner to yield crystalline phosphate.

The exhaust gases having a temperature of about 600 to 700° C. and which contained about 10% phosphorus pentoxide formed in the form of alkali metal phosphate, were withdrawn from spraying tower 6 through lower gas outlet 11 and washed with concentrated phosphoric acid as wash solution in a washing and absorption tower 12 arranged thereafter, whereby the phosphate was separated and combined with the solution of the reaction product. Concentrated phosphoric acid was preferred as wash solution in order to avoid dissolution of the chlorine or hydrogen chloride contained in the exhaust gas. About 256 kilograms per hour of chlorine gas left washing tower 12 and were conducted to unit 18 connected in series in order to obtain hydrogen chloride or for any further use. The hydrogen chloride formed in unit 18 was absorbed in absorption unit 19. The residual exhaust gas was withdrawn via line 20, blower 21 and chimney 22.

The yield of phosphate amounted to about 99.5%, calculated on the molten phosphorus used as starting material, the polyphosphate being substantially free from sodium chloride and containing, at most, about 0.02–0.05% sodium chloride. This residual impurity was thus present only in such an amount as was also contained in the fresh water introduced into the process.

*Example 2*

460 kilograms ground potassium chloride (containing 99.8% KCl) were sprayed, per hour, in a suspended, and thus very finely distributed, form with 100 m.³ oxygen through a nozzle into a phosphorus flame fed per hour with 100 kilograms molten phosphorus and 400 m.³ air enriched with oxygen (oxygen content about 50%). As nozzle mixing nozzle 5 of FIGURE 2 was used. The ratio of phosphorus pentoxide to potassium oxide which had formed was 1:1.0. About 650 kg. per hour of reaction product were obtained in the form of a melt containing 35.5% potassium oxide, 62.8% phosphorus pentoxide, less than 0.01% chlorine ions and 0.1% phosphorus trioxide. The melt was cooled with water and simultaneously dissolved and the solution so obtained was worked up in known manner to yield the crystalline phosphate. The off-gases were worked up as described in Example 1, 210 kilograms chlorine gas being obtained per hour.

The yield of phosphate amounted to about 99.6%, calculated on the molten phosphorus used as starting material, the phosphate containing only traces of about 0.02–0.05% potassium chloride. The polyphosphate was thus obtained with a satisfactory purity and was substantially free from alkali metal chloride.

*Example 3*

600 kilograms ground sodium chloride of the same purity as that described in Example 1 were sprayed, per hour, in a suspended, and thus finely distributed, form with 90 m.³ oxygen through mixing nozzle 5 into a phosphorus flame fed with 190 kilograms per hour molten phosphorus and 560 m.³ per hour air enriched with oxygen (oxygen content about 55%). The ratio of phosphorus pentoxide to sodium oxide which had formed was 1:1.63.

About 660 kilograms per hour of reaction product were obtained in the form of a melt containing 39.5% sodium oxide, 59% phosphorus pentoxide, 0.02% chlorine ions and 0.12% phosphorus trioxide. The melt was cooled with an aqueous phosphate solution and simultaneously dissolved and the solution so obtained worked up in known manner to yield the crystalline phosphate. The exhaust gases were worked up as described in Example 1, 350 kilograms chlorine gas being obtained per hour.

The yield of phosphate amounted to about 99.8%, calculated on the molten phosphorus used as starting material, the phosphate containing only 0.02–0.05% sodium chloride.

*Example 4*

390 kilograms sodium chloride of the same purity as in Example 1 were sprayed per hour in a suspended, and thus very finely distributed, form with 80 m.³ oxygen through a nozzle into a phosphorus flame fed per hour with 190 kilograms molten phosphorus and 380 m.³ air enriched with oxygen (oxygen content about 54%). As nozzle the one shown in FIGURE 2 was used but 80 kilograms steam at 156° C. were simultaneously introduced into the reaction mixture through feed line 4.

About 570 kilograms per hour of reaction product were obtained in the form of a melt containing 30% sodium oxide, 69% phosphorus pentoxide, less than 0.01% sodium chloride, and 0.08% phosphorus trioxide. After cooling, the melt constituted a polyphosphate glass. The exhaust gases were worked up as described in Example 1. 236 kilograms hydrogen chloride were obtained per hour, drawn off from washing tower 12 through line 17 and conducted to unit 19 for the absorption of hydrogen chloride.

The yield was as good as that obtained in the preceding examples. The degree of purity of the polyphosphate obtained by this method using an addition of steam was unobjectionable; the polyphosphate was substantially free from sodium chloride.

We claim:
1. Process for the production of alkali metal phosphate from alkali metal chlorides, phosphorus, an oxidizing gas selected from the group consisting of oxygen, air and mixtures thereof and water vapor, which comprises separately feeding molten phosphorus, said oxidizing gas, said alkali metal chloride and water vapor concentrically of one another, in the same direction and along the same axial path to one another to a reaction zone of high energy density consisting of an incandescent flame produced by combustion of atomized molten phosphorus with the oxidizing gas, said alkali metal chloride being fed centrally of the phosphorus, oxidizing gas and water vapor atomizing and vaporizing the alkali metal chloride within said flame, reacting the resulting gaseous phosphorus combustion products with gaseous alkali metal chloride and the water vapor with the formation of alkali metal phosphate and hydrogen chloride and recovering the alkali metal phosphate, said alkali metal phosphate having a molar ratio of $P_2O_5$ to alkali metal oxide within the range of about 1:1 to about 1:2, the phosphorus, the oxidizing gas and the alkali metal chloride being supplied in such amounts that about 90 to 500 liters oxygen are fed per 100 grams phosphorus.

2. The process of claim 1 wherein the alkali metal chloride is suspended in a stream of at least one substance selected from the group consisting of oxygen and air.

3. Process for the production of alkali metal phosphates from alkali metal chlorides, phosphorus and an oxidizing gas selected from the group consisting of oxygen, air and mixtures thereof, which comprises separately feeding molten phosphorus, said oxidizing gas and said alkali metal chloride concentrically of one another, in the same direction and along the same axial path to one another to a reaction zone of high density energy consisting of an incandescent flame produced by combustion of atomized molten phosphorus with the oxidizing gas said alkali metal chloride being fed centrally of the phosphorus and oxidizing gas, atomizing and vaporizing the alkali metal chloride within said flame, reacting the resulting gaseous phosphorus combustion products with gaseous alkali metal chloride with the formation of alkali metal phosphate and chlorine and recovering the alkali metal phosphate, said alkali metal phosphate having a molar ratio of $P_2O_5$ to alkali metal oxide within the range of about 1:1 to about 1:2, the phosphorus, the oxidizing gas and the alkali metal chloride being supplied in such amounts that the oxygen of the oxidizing gas is used in an excess amount of at least about 30%, calculated on the stoichiometrical amount related to the formation of $P_2O_5$.

4. The process of claim 3 wherein the chlorine after separation from the phosphorus-containing reaction products is converted into hydrochloric acid and absorbed in this form.

References Cited in the file of this patent
UNITED STATES PATENTS

| | | |
|---|---|---|
| 2,142,944 | Kerschbaum | Jan. 3, 1939 |
| 2,635,946 | Weber et al. | Apr. 21, 1953 |
| 2,776,187 | Pfengle | Jan. 1, 1957 |
| 2,792,284 | Alexander | May 14, 1957 |
| 2,968,529 | Wilson | Jan. 17, 1961 |
| 2,977,317 | Rodis et al. | Mar. 28, 1961 |
| 2,980,509 | Frey | Apr. 18, 1961 |
| 3,011,864 | Morse et al. | Dec. 5, 1961 |
| 3,050,374 | Burt et al. | Aug. 21, 1962 |

UNITED STATES PATENT OFFICE
CERTIFICATE OF CORRECTION

Patent No. 3,168,373　　　　　　　　　　　　　　February 2, 1965

Gerhard Hartlapp et al.

It is hereby certified that error appears in the above numbered patent requiring correction and that the said Letters Patent should read as corrected below.

Column 1, line 28, for "of", second occurrence, read -- or --; line 55, for "nad" read -- and --; column 4, lines 39 and 40, and line 43, for "phosphorous", each occurrence, read -- phosphorus --; column 5, line 62, for "100" read -- 190 --.

Signed and sealed this 24th day of August 1965.

(SEAL)
Attest:

ERNEST W. SWIDER　　　　　　　　　　　　　　EDWARD J. BRENNER
Attesting Officer　　　　　　　　　　　　　　Commissioner of Patents